United States Patent Office.

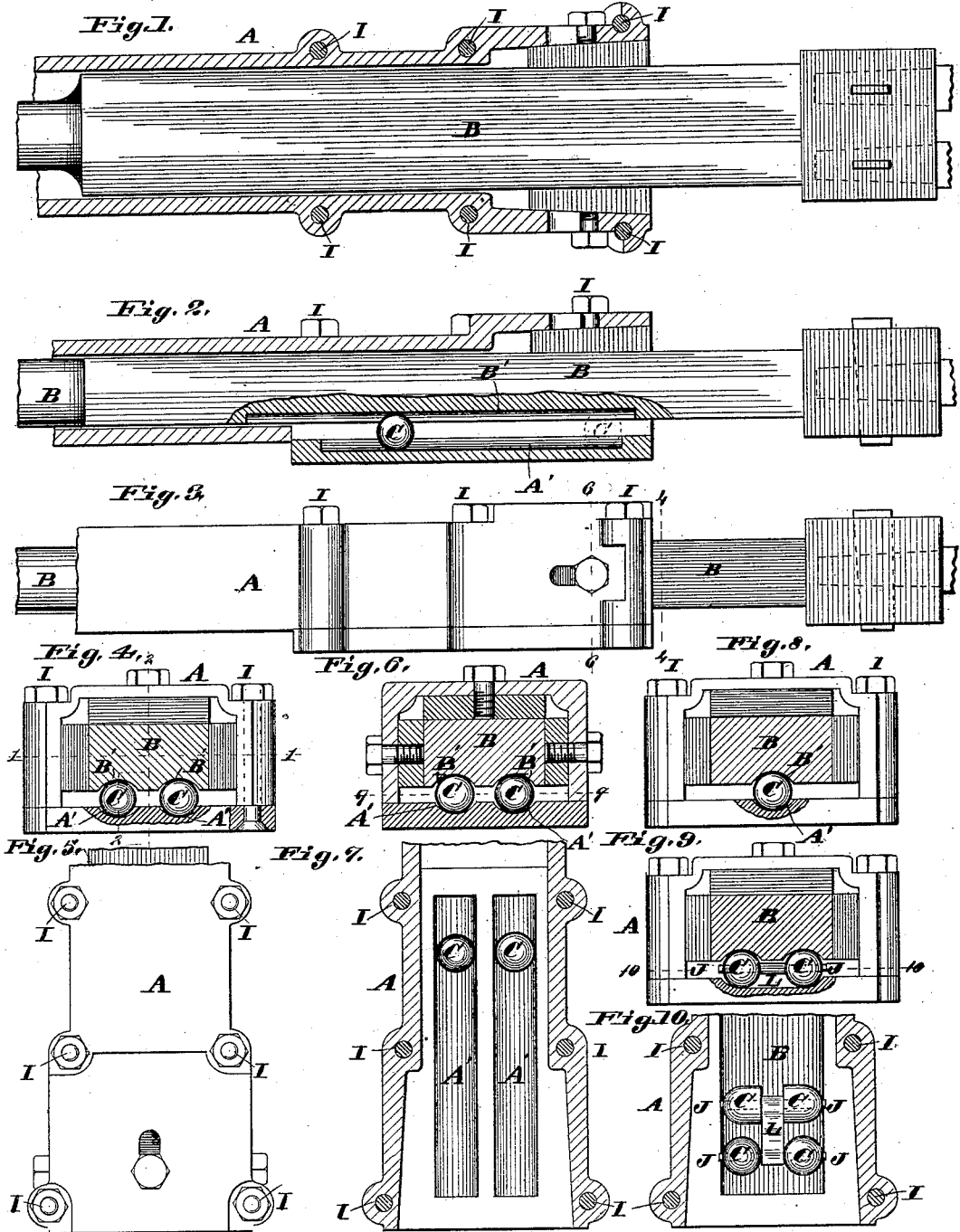

BENHARD YOCH, OF ST. LOUIS, MISSOURI.

MINING-MACHINE.

SPECIFICATION forming part of Letters Patent No. 318,337, dated May 19, 1885.

Application filed January 12, 1885. (No model.)

*To all whom it may concern:*

Be it known that I, BENHARD YOCH, of the city of St. Louis, in the State of Missouri, have invented a certain new and useful Improvement in Mining-Machines, of which the following is a full, clear, and exact description, reference being had to the accompanying drawings, forming part of this specification, and in which—

Figure 1 is a horizontal section taken on line 1 1, Fig. 4, showing the piston-rod in top view. Fig. 2 is a vertical section taken on line 2 2, Fig. 4. Fig. 3 is a side view. Fig. 4 is a transverse section taken on line 4 4, Fig. 3. Fig. 5 is a detail view. Fig. 6 is a transverse section taken on line 6 6, Fig. 3. Fig. 7 is a detail longitudinal section taken on line 7 7, Fig. 6. Figs. 8, 9, and 10 are views illustrating modified forms of my preferred construction, Figs. 8 and 9 being end views of the sleeve or frame, part broken away, and a transverse section of the piston-rod, taken, say, on line 4 4, Fig. 3, and Fig. 10 being a section taken on line 10 10, Fig. 9.

My invention relates to an improvement that is applicable to all kinds of mining-machines having the picks secured to and carried by piston-rods of engines; and my invention consists in placing one or more antifriction balls or rollers within a sleeve or frame secured to or formed upon the end of the cylinder, and between the bottom plate of said sleeve and the under side of the piston-rod which works therethrough.

Referring to the drawings, A represents a sleeve or frame that is formed upon or secured to the forward head of a mining-machine cylinder—as, for instance, in my Patent No. 263,645, issued August 29, 1882. In the present case I prefer to make it square, the outer end of the piston-rod B being correspondingly shaped.

Between the rod and the bottom of the sleeve or frame I place one or more balls, C, in grooves A' and B', made in the sleeve and rod, respectively. These balls form an antifriction bearing for the piston-rod, (which is heavy itself, and, in addition, is weighed down by the heavy pick or picks which it carries,) causing the machine to run very much lighter than it otherwise would. The heavy piston-rod, in the absence of the balls sliding on the sleeve or frame which is employed to support it, causes a great amount of friction and wear, and this is increased by dirt and gravel getting between them while the machine is at work. With my improvement the friction is very much decreased and the wearing caused by the dirt and gravel is entirely obviated, the bearing parts being completely inclosed and protected by the sleeve A.

To facilitate the insertion of the ball or balls, I make one, at least, of the four sides of the sleeve, preferably the lower side piece, removable and secure it to the body of the sleeve by bolts I. I prefer to use two balls, as shown in Figs. 2, 4, 6, and 7; but one only could be used, as shown in Fig. 8, or four could be used, as shown in Figs. 9 and 10, but in this case it would be necessary to place them on journals J of blocks L; and one or more of them may be non-circular, (see Fig. 10,) so as to act like rollers.

My improvement can be applied to any machine carrying a tool on the end of a piston-rod.

I am aware that it is not broadly new to place a ball or roller beneath the piston-rod of a mining-machine for the purpose of reducing the friction of said rod.

I claim as my invention—

1. In a mining-machine, the combination of the piston-rod, a sleeve or frame through which said piston-rod works, having a removable side piece, and one or more balls or rollers interposed between said rod and the sleeve, substantially as and for the purposes set forth.

2. In a mining-machine, the combination of the piston-rod adapted to carry a pick, a sleeve or frame through which said piston-rod works, having a removable bottom piece, and one or more balls or rollers interposed between the said rod and the bottom piece of the sleeve, substantially as and for the purposes set forth.

3. In a mining-machine, the combination of a piston-rod having one or more longitudinal grooves in its under side, a sleeve or frame through which said piston works, having a removable side piece, and a groove or grooves in its bottom plate corresponding to those in the piston-rod, and one or more loose balls or rollers placed therein, substantially as and for the purpose set forth.

BENHARD YOCH.

In presence of—
GEO. H. KNIGHT,
SAML. KNIGHT.